(12) United States Patent
Mokhasi et al.

(10) Patent No.: US 12,112,303 B2
(45) Date of Patent: Oct. 8, 2024

(54) METHOD, SYSTEM, AND COMPUTER PROGRAM PRODUCT FOR PROCESSING A PAYMENT TRANSACTION VIA A PROXY GUARANTOR

(71) Applicant: Visa International Service Association, San Francisco, CA (US)

(72) Inventors: Gaurav Srikant Mokhasi, Evanston, IL (US); Rohit Sukhija, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/435,084

(22) PCT Filed: Jun. 26, 2019

(86) PCT No.: PCT/US2019/039218
§ 371 (c)(1),
(2) Date: Aug. 31, 2021

(87) PCT Pub. No.: WO2020/263241
PCT Pub. Date: Dec. 30, 2020

(65) Prior Publication Data
US 2022/0138709 A1    May 5, 2022

(51) Int. Cl.
*G06Q 20/10* (2012.01)
*G06Q 20/06* (2012.01)
(Continued)

(52) U.S. Cl.
CPC ......... *G06Q 20/102* (2013.01); *G06Q 20/065* (2013.01); *G06Q 20/4014* (2013.01); *G06Q 40/02* (2013.01)

(58) Field of Classification Search
None
See application file for complete search history.

(56) References Cited

U.S. PATENT DOCUMENTS

| 8,676,708 B1 | 3/2014 | Honey |
| 10,467,615 B1 | 11/2019 | Omojola et al. |

(Continued)

FOREIGN PATENT DOCUMENTS

| CA | 2811197 C | * 2/2017 | ......... G06Q 20/3572 |
| CN | 107004194 A | 8/2017 | |

(Continued)

*Primary Examiner* — Ayal I. Sharon
(74) *Attorney, Agent, or Firm* — The Webb Law Firm

(57) ABSTRACT

A method for processing a payment transaction via a proxy guarantor includes receiving a transaction request associated with a payment transaction for a transaction amount. The payment transaction is associated with a user, and the transaction request includes: payment device data associated with a payment device of the user, the payment device associated with a debit account, and guarantor data identifying a guarantor associated with a credit account. The method further includes communicating a hold request to an issuer system associated with the credit account to cause the issuer system associated with the credit account to place a hold on the credit account for at least a portion of the transaction amount, and communicating an authorization request to an issuer system associated with the debit account.

8 Claims, 8 Drawing Sheets

(51) Int. Cl.
*G06Q 20/40* (2012.01)
*G06Q 40/02* (2012.01)

(56) References Cited

U.S. PATENT DOCUMENTS

| | | | |
|---|---|---|---|
| 10,510,072 B2 | 12/2019 | Salama et al. | |
| 10,984,411 B1 | 4/2021 | Hayes et al. | |
| 11,093,937 B2 | 8/2021 | Lattanzio et al. | |
| 2001/0021925 A1 | 9/2001 | Ukigawa et al. | |
| 2002/0198827 A1 | 12/2002 | van Leeuwen | |
| 2003/0069857 A1* | 4/2003 | Junda | G06Q 20/383 705/74 |
| 2003/0183689 A1* | 10/2003 | Swift | G06Q 20/04 235/380 |
| 2003/0187786 A1* | 10/2003 | Swift | G06Q 20/0425 705/39 |
| 2003/0187790 A1* | 10/2003 | Swift | G06Q 20/102 705/40 |
| 2003/0187796 A1* | 10/2003 | Swift | G06Q 20/042 705/45 |
| 2004/0098353 A1* | 5/2004 | Smith, III | G06Q 30/0601 705/75 |
| 2009/0289106 A1* | 11/2009 | Bishop | G06Q 20/20 235/379 |
| 2010/0005023 A1 | 1/2010 | Bayne | |
| 2012/0324242 A1* | 12/2012 | Kirsch | G06F 21/6245 713/189 |
| 2013/0166402 A1* | 6/2013 | Parento | G06Q 20/227 705/21 |
| 2014/0040131 A1* | 2/2014 | Andrews | G06Q 20/3572 705/44 |
| 2014/0279512 A1* | 9/2014 | Dodds-Brown | G06Q 20/227 705/44 |
| 2015/0120551 A1 | 4/2015 | Jung et al. | |
| 2015/0199689 A1 | 7/2015 | Kumnick et al. | |
| 2015/0287135 A1 | 10/2015 | Fomukong | |
| 2015/0324766 A1 | 11/2015 | Park et al. | |
| 2017/0186006 A1* | 6/2017 | Das | G06Q 20/229 |
| 2017/0200158 A1 | 7/2017 | Honey et al. | |
| 2017/0323294 A1 | 11/2017 | Rohlfing et al. | |
| 2017/0364914 A1 | 12/2017 | Howard | |
| 2018/0082284 A1 | 3/2018 | Gomes et al. | |
| 2019/0080401 A1 | 3/2019 | Fomukong | |
| 2019/0096002 A1* | 3/2019 | Kharma | G06Q 40/08 |
| 2020/0126066 A1* | 4/2020 | Singh | G06Q 20/405 |
| 2021/0004896 A1* | 1/2021 | Gannon | G06Q 20/023 |
| 2021/0042734 A1 | 2/2021 | Malhotra et al. | |
| 2021/0233041 A1* | 7/2021 | Sukhija | G06Q 20/382 |

FOREIGN PATENT DOCUMENTS

| | | | |
|---|---|---|---|
| CN | 109074564 A | 12/2018 | |
| GB | 2467530 A | 8/2010 | |
| WO | WO-03083751 A1 * | 10/2003 | ............ G06Q 20/02 |
| WO | 2005109307 A2 | 11/2005 | |
| WO | WO-2011008625 A1 * | 1/2011 | ............ G06Q 20/02 |
| WO | WO-2018005635 A2 * | 1/2018 | ........... G06Q 20/227 |

\* cited by examiner

40

Proxy Check-Out Form

32 — User Name: John Smith

42 — User Debit Card PAN: 1234567891011111
PIN Number: 4321
Expiration Date: 01/2020

44 — Guarantor Name: Jane Smith
Guarantor Contact Information:
Phone Number: (650) 987-6543
Email Address jane.smith@email.com

[Submit]

FIG. 3

METHOD, SYSTEM, AND COMPUTER PROGRAM PRODUCT FOR PROCESSING A PAYMENT TRANSACTION VIA A PROXY GUARANTOR

CROSS-REFERENCE PATENT APPLICATION

This application is the United States national phase of International Application No. PCT/US2019/039218 filed Jun. 26, 2019, the entire disclosure of which is hereby incorporated by reference in its entirety.

BACKGROUND

1. Technical Field

The disclosure relates to processing payment transactions and, in some non-limiting embodiments or aspects, to a method, system, and computer program product for processing payment transactions via a proxy guarantor.

2. Technical Considerations

Certain merchants, including certain merchants selling goods and/or services via a merchant website, only accept credit cards as the payment method. This restriction presents a problem for many users that may have a debit card and/or a bank account but not a credit card, as these users lack a payment device capable in initiating a payment transaction with credit-only merchants. Existing systems do not provide an efficient solution that enables users to nonetheless conduct payment transactions with credit-only merchants using their debit card or bank account.

SUMMARY

According to some non-limiting embodiments or aspects, a method for processing a payment transaction via a proxy guarantor includes: receiving, with at least one processor, a transaction request associated with a payment transaction for a transaction amount, where the payment transaction is associated with a user, the transaction request including: payment device data associated with a payment device of the user, the payment device associated with a debit account; and guarantor data identifying a guarantor associated with a credit account; communicating, with at least one processor, a hold request to an issuer system associated with the credit account to cause the issuer system associated with the credit account to place a hold on the credit account for at least a portion of the transaction amount; and communicating, with at least one processor, an authorization request to an issuer system associated with the debit account.

In some non-limiting embodiments or aspects, the guarantor data may include at least one of payment device data associated with a payment device associated with the credit account and contact data associated with the guarantor. The method may further include: communicating, with at least one processor, a message to a computing device of the guarantor based on the guarantor data; and receiving, with at least one processor, a response message from the computing device of the guarantor, where the response message includes payment device data associated with a payment device associated with the credit account. The message may include user identifying data associated with the user and may prompt the computing device of the guarantor to generate the response message. The method may further include: receiving, with at least one processor, an authorization response from the issuer system associated with the debit account, where the authorization response includes an authorization approval; and communicating, with at least one processor, a hold removal message to the issuer system associated with the credit account, the hold removal message configured to cause the issuer system associated with the credit account to remove the hold on the credit account. During settlement of the payment transaction, the transaction amount may be transferred from the debit account to an account of a merchant associated with the payment transaction.

In some non-limiting embodiments or aspects, the method may include: receiving, with at least one processor, an authorization response from the issuer system associated with the debit account, where the authorization response includes an authorization decline; and communicating, with at least one processor, a second authorization request to the issuer system associated with the credit account. During settlement of the payment transaction, the transaction amount may be transferred from the credit account to an account of a merchant associated with the payment transaction.

According to some non-limiting embodiments or aspects, a system for processing a payment transaction via a proxy guarantor includes at least one processor programmed or configured to: receive a transaction request associated with a payment transaction for a transaction amount, where the payment transaction is associated with a user, the transaction request including: payment device data associated with a payment device of the user, the payment device associated with a debit account; and guarantor data identifying a guarantor associated with a credit account; communicate a hold request to an issuer system associated with the credit account to cause the issuer system associated with the credit account to place a hold on the credit account for at least a portion of the transaction amount; and communicate an authorization request to an issuer system associated with the debit account.

In some non-limiting embodiments or aspects, the guarantor data may include at least one of payment device data associated with a payment device associated with the credit account and contact data associated with the guarantor. The at least one processor may be further programmed or configured to: communicate a message to a computing device of the guarantor based on the guarantor data; and receive a response message from the computing device of the guarantor, where the response message includes payment device data associated with a payment device associated with the credit account. The message may include user identifying data associated with the user and may prompt the computing device of the guarantor to generate the response message. The at least one processor may be further programmed or configured to: receive an authorization response from the issuer system associated with the debit account, where the authorization response includes an authorization approval; and communicate a hold removal message to the issuer system associated with the credit account, the hold removal message configured to cause the issuer system associated with the credit account to remove the hold on the credit account. During settlement of the payment transaction, the transaction amount may be transferred from the debit account to an account of a merchant associated with the payment transaction.

In some non-limiting embodiments or aspects, the at least one processor may be further programmed or configured to: receive an authorization response from the issuer system associated with the debit account, where the authorization response includes an authorization decline; and communicate a second authorization request to the issuer system associated with the credit account. During settlement of the payment transaction, the transaction amount may be transferred from the credit account to an account of a merchant associated with the payment transaction.

According to some non-limiting embodiments or aspects, a computer program product for processing a payment transaction via a proxy guarantor includes at least one non-transitory computer-readable medium including one or more instructions that, when executed by at least one processor, cause the at least one processor to: receive a transaction request associated with a payment transaction for a transaction amount, where the payment transaction is associated with a user, the transaction request including: payment device data associated with a payment device of the user, the payment device associated with a debit account; and guarantor data identifying a guarantor associated with a credit account; communicate a hold request to an issuer system associated with the credit account to cause the issuer system associated with the credit account to place a hold on the credit account for at least a portion of the transaction amount; and communicate an authorization request to an issuer system associated with the debit account.

In some non-limiting embodiments or aspects, the guarantor data may include at least one of payment device data associated with a payment device associated with the credit account and contact data associated with the guarantor. The one or more instructions may cause the at least one processor to: communicate a message to a computing device of the guarantor based on the guarantor data; and receive a response message from the computing device of the guarantor, where the response message includes payment device data associated with a payment device associated with the credit account. The message may include user identifying data associated with the user and may prompt the computing device of the guarantor to generate the response message. The one or more instructions may cause the at least one processor to: receive an authorization response from the issuer system associated with the debit account, where the authorization response includes an authorization approval; and communicate a hold removal message to the issuer system associated with the credit account, the hold removal message configured to cause the issuer system associated with the credit account to remove the hold on the credit account. During settlement of the payment transaction, the transaction amount may be transferred from the debit account to an account of a merchant associated with the payment transaction.

In some non-limiting embodiments or aspects, the one or more instructions may cause the at least one processor to: receive an authorization response from the issuer system associated with the debit account, where the authorization response includes an authorization decline; and communicate a second authorization request to the issuer system associated with the credit account. During settlement of the payment transaction, the transaction amount may be transferred from the credit account to an account of a merchant associated with the payment transaction.

Further non-limiting embodiments or aspects are set forth in the following numbered clauses:

Clause 1: A method for processing a payment transaction via a proxy guarantor, comprising: receiving, with at least one processor, a transaction request associated with a payment transaction for a transaction amount, wherein the payment transaction is associated with a user, the transaction request comprising: payment device data associated with a payment device of the user, the payment device associated with a debit account; and guarantor data identifying a guarantor associated with a credit account; communicating, with at least one processor, a hold request to an issuer system associated with the credit account to cause the issuer system associated with the credit account to place a hold on the credit account for at least a portion of the transaction amount; and communicating, with at least one processor, an authorization request to an issuer system associated with the debit account.

Clause 2: The method of clause 1, wherein the guarantor data comprises at least one of payment device data associated with a payment device associated with the credit account and contact data associated with the guarantor.

Clause 3: The method of clause 1 or 2, further comprising: communicating, with at least one processor, a message to a computing device of the guarantor based on the guarantor data; and receiving, with at least one processor, a response message from the computing device of the guarantor, wherein the response message comprises payment device data associated with a payment device associated with the credit account.

Clause 4: The method of any of clauses 1-3, wherein the message comprises user identifying data associated with the user and prompts the computing device of the guarantor to generate the response message.

Clause 5: The method of any of clauses 1-4, further comprising: receiving, with at least one processor, an authorization response from the issuer system associated with the debit account, wherein the authorization response comprises an authorization approval; and communicating, with at least one processor, a hold removal message to the issuer system associated with the credit account, the hold removal message configured to cause the issuer system associated with the credit account to remove the hold on the credit account.

Clause 6: The method of any of clauses 1-5, wherein during settlement of the payment transaction, the transaction amount is transferred from the debit account to an account of a merchant associated with the payment transaction.

Clause 7: The method of any of clauses 1-6, further comprising: receiving, with at least one processor, an authorization response from the issuer system associated with the debit account, wherein the authorization response comprises an authorization decline; and communicating, with at least one processor, a second authorization request to the issuer system associated with the credit account.

Clause 8: The method of any of clauses 1-7, wherein during settlement of the payment transaction, the transaction amount is transferred from the credit account to an account of a merchant associated with the payment transaction.

Clause 9: A system for processing a payment transaction via a proxy guarantor, comprising at least one processor programmed or configured to: receive a transaction request associated with a payment transaction for a transaction amount, wherein the payment transaction is associated with a user, the transaction request comprising: payment device data associated with a payment device of the user, the payment device associated with a debit account; and guarantor data identifying a guarantor associated with a credit account; communicate a hold request to an issuer system associated with the credit account to cause the issuer system associated with the credit account to place a hold on the credit account for at least a portion of the transaction amount; and communicate an authorization request to an issuer system associated with the debit account.

Clause 10: The system of clause 9, wherein the guarantor data comprises at least one of payment device data associated with a payment device associated with the credit account and contact data associated with the guarantor.

Clause 11: The system of clause 9 or 10, wherein the at least one processor is further programmed or configured to: communicate a message to a computing device of the guarantor based on the guarantor data; and receive a response message from the computing device of the guarantor, wherein the response message comprises payment device data associated with a payment device associated with the credit account.

Clause 12: The system of any of clauses 9-11, wherein the message comprises user identifying data associated with the user and prompts the computing device of the guarantor to generate the response message.

Clause 13: The system of any of clauses 9-12, wherein the at least one processor is further programmed or configured to: receive an authorization response from the issuer system associated with the debit account, wherein the authorization response comprises an authorization approval; and communicate a hold removal message to the issuer system associated with the credit account, the hold removal message configured to cause the issuer system associated with the credit account to remove the hold on the credit account.

Clause 14: The system of any of clauses 9-13, wherein during settlement of the payment transaction, the transaction amount is transferred from the debit account to an account of a merchant associated with the payment transaction.

Clause 15: The system of any of clauses 9-14, wherein the at least one processor is further programmed or configured to: receive an authorization response from the issuer system associated with the debit account, wherein the authorization response comprises an authorization decline; and communicate a second authorization request to the issuer system associated with the credit account.

Clause 16: The system of any of clauses 9-15, wherein during settlement of the payment transaction, the transaction amount is transferred from the credit account to an account of a merchant associated with the payment transaction.

Clause 17: A computer program product for processing a payment transaction via a proxy guarantor, the computer program product comprising at least one non-transitory computer-readable medium including one or more instructions that, when executed by at least one processor, cause the at least one processor to: receive a transaction request associated with a payment transaction for a transaction amount, wherein the payment transaction is associated with a user, the transaction request comprising: payment device data associated with a payment device of the user, the payment device associated with a debit account; and guarantor data identifying a guarantor associated with a credit account; communicate a hold request to an issuer system associated with the credit account to cause the issuer system associated with the credit account to place a hold on the credit account for at least a portion of the transaction amount; and communicate an authorization request to an issuer system associated with the debit account.

Clause 18: The computer program product of clause 17, wherein the guarantor data comprises at least one of payment device data associated with a payment device associated with the credit account and contact data associated with the guarantor.

Clause 19: The computer program product of clause 17 or 18, wherein the one or more instructions cause the at least one processor to: communicate a message to a computing device of the guarantor based on the guarantor data; and receive a response message from the computing device of the guarantor, wherein the response message comprises payment device data associated with a payment device associated with the credit account.

Clause 20: The computer program product of any of clauses 17-19, wherein the message comprises user identifying data associated with the user and prompts the computing device of the guarantor to generate the response message.

Clause 21: The computer program product of any of clauses 17-20, wherein the one or more instructions cause the at least one processor to: receive an authorization response from the issuer system associated with the debit account, wherein the authorization response comprises an authorization approval; and communicate a hold removal message to the issuer system associated with the credit account, the hold removal message configured to cause the issuer system associated with the credit account to remove the hold on the credit account.

Clause 22: The computer program product of any of clauses 17-21, wherein during settlement of the payment transaction, the transaction amount is transferred from the debit account to an account of a merchant associated with the payment transaction.

Clause 23: The computer program product of any of clauses 17-22, wherein the one or more instructions cause the at least one processor to: receive an authorization response from the issuer system associated with the debit account, wherein the authorization response comprises an authorization decline; and communicate a second authorization request to the issuer system associated with the credit account.

Clause 24: The computer program product of any of clauses 17-23, wherein during settlement of the payment transaction, the transaction amount is transferred from the credit account to an account of a merchant associated with the payment transaction.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise. Further, the phrase "based on" is intended to mean "based at least partially on" unless explicitly stated otherwise.

BRIEF DESCRIPTION OF THE DRAWINGS

Additional advantages and details of the disclosure are explained in greater detail below with reference to the non-limiting exemplary embodiments that are illustrated in the accompanying schematic figures, in which:

FIG. 3 shows a graphical user interface of a proxy check-out interface on a merchant website according to some non-limiting embodiments or aspects;

DETAILED DESCRIPTION

Figure 1:
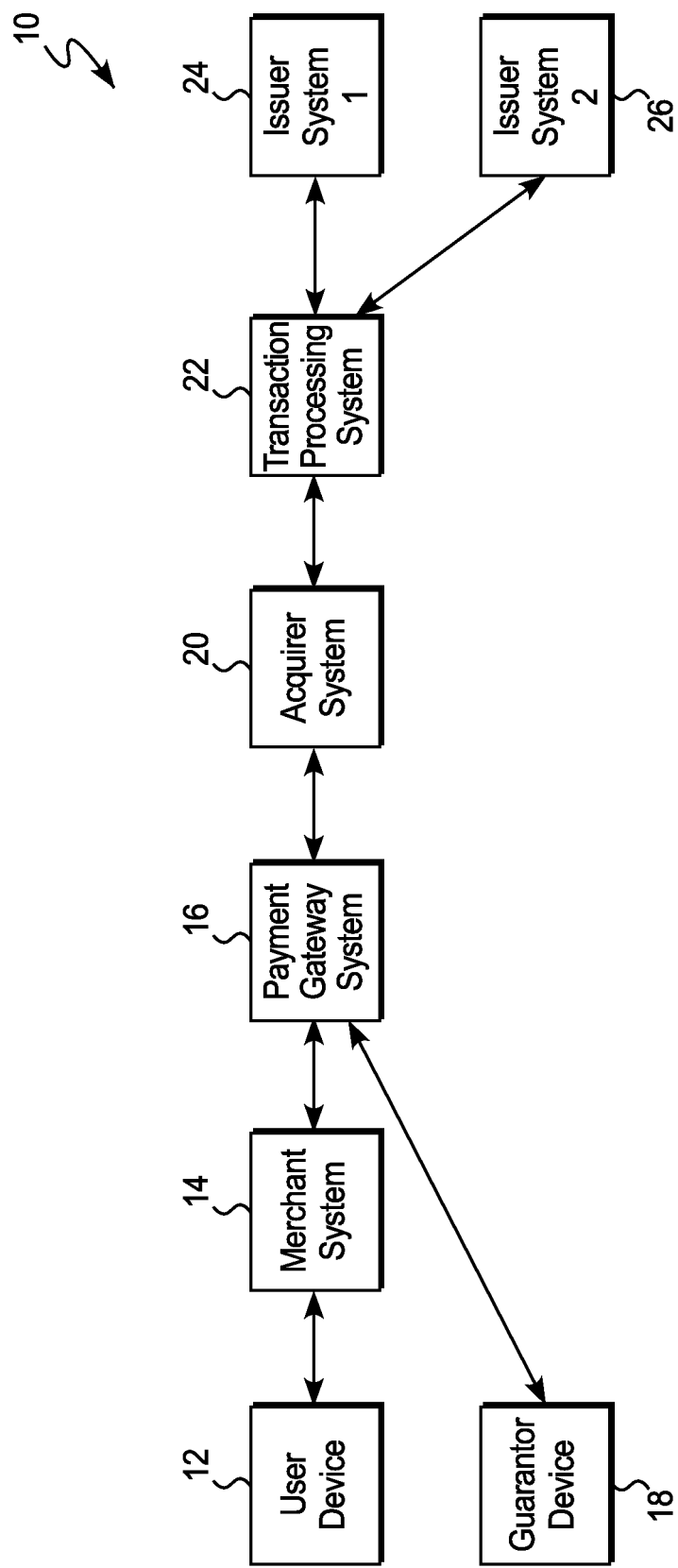
FIG. 1 shows a schematic view of a system for processing a payment transaction via a proxy guarantor according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

The term "account data," as used herein, refers to any data concerning one or more accounts for one or more users. Account data may include, for example, one or more account identifiers, user identifiers, transaction histories, balances, credit limits, issuer institution identifiers, and/or the like.

As used herein, the term "account identifier" may include one or more types of identifiers associated with a user account (e.g., a PAN, a primary account number, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a payment device (e.g., a portable payment instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "acquirer institution" may refer to an entity licensed and/or approved by the transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. As used herein, the term "acquirer system" may refer to one or more computer systems, computer devices, software applications, and/or the like operated by or on behalf of an acquirer institution.

As used herein, the term "card-present transaction" may refer to a payment transaction initiated with a payment device in which the cardholder physically presents the payment device at the time the payment transaction is initiated with the payment device. A non-limiting example of a card-present transaction is a payment transaction initiated at a brick-and-mortar retail store with a physical POS system, during which the cardholder physically presents the payment device to the merchant.

As used herein, the term "card-not-present transaction" or "CNP transaction" may refer to a payment transaction initiated with a payment device in which the cardholder does not or cannot physically present the payment device at the time the payment transaction is initiated with the payment device. Non-limiting examples of CNP transactions include transactions initiated by mail, facsimile, or over the telephone or the internet.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. As used herein, the terms "merchant" or "merchant system" may also refer to one or more computer systems operated by or on behalf of a merchant, such as a server computer executing one or more software applications. As used herein, the term "point-of-sale (POS) system," may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account data, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computer devices, servers, groups of servers, and/or the like operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

Non-limiting embodiments or aspects of the present disclosure are directed to a method, system, and computer program product for processing a payment transaction via a proxy guarantor. Non-limiting embodiments or aspects enable a user without a credit account to initiate payment transactions using their debit account with merchants that only accept credit accounts. By providing a proxy guarantor who does have a credit account, the user is enabled to initiate the payment transaction using their debit account and to have the debit account be the account from which funds are transferred for the transaction amount during settlement. Non-limiting embodiments or aspects of the disclosure utilize an unconventional message sent to a guarantor device during processing of the payment transaction which enables the guarantor to view details of the payment transaction, enter payment device data associated with their credit account, authorize the payment transaction as the guarantor, and/or reject the transaction as the guarantor. Various transaction messages communicated between the systems described herein engaging to process the payment transaction may be modified to contain an indicator that the payment transaction is being processed as a proxy guarantor payment transactions (also referred to interchangeably herein as "proxy payment transaction" or "proxy transaction"), where the indicator causes the payment transaction to be processed via a proxy guarantor payment transaction protocol (also referred to herein as "proxy transaction protocol"). Non-limiting embodiments or aspects enable a hold to be placed on the guarantor's credit account during processing of the payment transaction, which allows for a first attempt to process the transaction using the bank account associated with the debit account of the user. With this new arrangement, a debit account may be used to pay the transaction amount, even with a credit-only merchant. In response to successfully processing the payment transaction using the user's debit account, the hold placed on the guarantor's credit account may be removed. Non-limiting embodiments or aspects enable the credit account of the user to be used for the payment transaction if processing via the bank account associated with the debit account of the user fails.

Referring to FIG. 1, a system 10 for processing payment transactions via a proxy guarantor according to some non-limiting embodiments or aspects is shown. The system 10 may include a user device 12 associated with a user (e.g. a consumer) in communication with a merchant system 14 (e.g., merchant POS system) operated by or on behalf of a merchant providing goods and/or services. The user device 12 may communicate with the merchant system 14 to initiate a payment transaction between the user and the merchant. The user device 12 may include a computing device capable of initiating a payment transaction with the merchant system 12. In some non-limiting embodiments or aspects, the user may initiate the payment transaction with the merchant system 14 by physically presenting a payment device (e.g., a debit card) to the merchant. The payment device may include payment device data associated with the payment device of the user associated with a debit account to be used to process the payment transaction, such as an account identifier (e.g., a PAN), a card verification value (CVV) code, a PIN number, an expiration date, and/or the like. The payment transaction may be a card-present transaction or a card-not-present transaction (e.g., initiated via a merchant website or a merchant application).

Referring to FIGS. 1-4, the payment transaction may be a payment via proxy transaction executed according to a proxy transaction protocol. In some non-limiting embodiments or aspects the merchant may only accept credit accounts to initiate payment transactions and/or the merchant may not accept payment devices associated with a debit account. The proxy transaction protocol allows for a user that does not have a credit account to initiate a payment transaction with such a merchant using their debit account and a guarantor who has a credit account.

Figure 2:
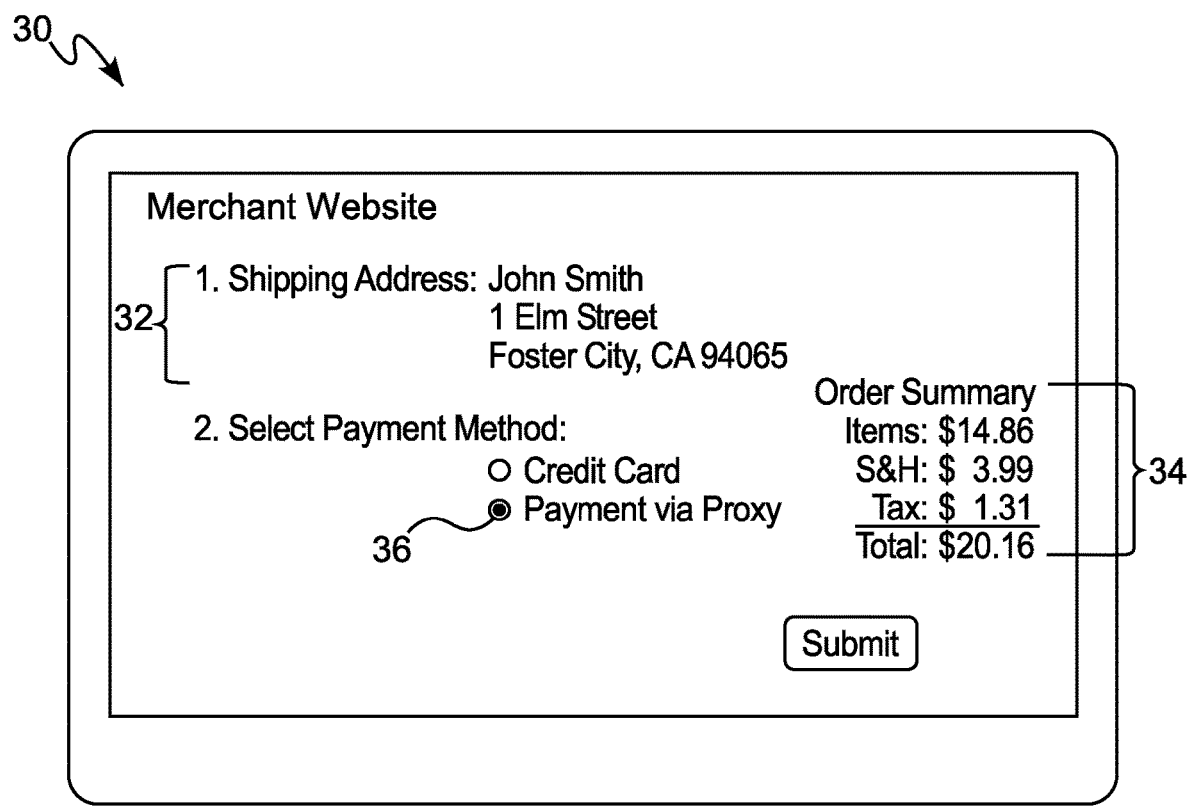
FIG. 2 shows a graphical user interface of a merchant website payment interface according to some non-limiting embodiments or aspects.

Referring to FIG. 2, during initiation of the payment transaction, the user may indicate that the payment transaction is a payment via proxy transaction to cause the system 10 to process the payment transaction according to the proxy transaction protocol. In some non-limiting embodiments or aspects, during initiation of the payment transaction the user may be prompted to select a payment method. FIG. 2 shows a non-limiting example in which the user initiating a payment transaction on a merchant website (or a merchant application or a user interface of a merchant POS device, as other non-limiting examples) is prompted to select a payment method on a check-out user interface 30. The check-out user interface 30 may include user data 32 associated with the user, such as user name, user contact data (e.g., residential address, shipping address, telephone number, fax number, email address, social media handle, and the like), and/or the like. The check-out user interface 30 may include order data 34 associated with the order associated with the payment transaction. The order data 34 may include merchant data (e.g., merchant name, merchant contact data, merchant category code, and the like), prices associated with goods and/or services of the merchant, shipping and handling, tax, total price, data associated with the goods (e.g., type of goods, name of goods, UPC code associated with goods, quantity of goods, and the like), and the like. The check-out user interface 30 may include a selectable option 36 to allow the user to indicate (e.g., via the user device 12 and/or a merchant POS device and/or the like) that the payment transaction is to be processed as a payment via proxy transaction. The arrangement of the check-out user interface 30 enabling the user to initiate a payment via proxy transaction shown in FIG. 2 is exemplary only and may take many different forms.

Referring to FIG. 3, in response to the user selecting the payment via proxy selectable option 36 on the check-out user interface 30 (FIG. 2), the user device 12 or other computing device (e.g., merchant POS device) may display a proxy check-out interface 40. The proxy check-out interface 40 may display at least a portion of the user data 32. The proxy check-out interface 40 may enable a user to provide payment device data 42 associated with the payment device (e.g., debit card) of the user associated with the debit account of the user. The proxy check-out interface 40 may enable a user to provide guarantor data 44. The guarantor data 44 may be any data capable of identifying a guarantor associated with a credit account (e.g., an individual having a credit account). The guarantor data 44 may include guarantor name, guarantor contact data (e.g., residential address, telephone number, fax number, email address, social media handle, and/or the like), and/or the like. In some non-limiting embodiments or aspects, the proxy check-out interface 40 may enable a user to provide payment device data associated with a credit account of the guarantor. The user may submit the data provided to the proxy check-out interface 40 to initiate the payment transaction.

In some non-limiting embodiments or aspects, in order to process the payment transaction as a proxy transaction, the user may be prompted to authenticate his/her identity using an authentication method. The authentication method may include a two-factor authentication method, such as a one-time password (OTP) two-factor authentication process. The authentication of the user may ensure that the proxy transaction is not being fraudulently initiated.

Referring again to FIG. 1, in response to the payment transaction being initiated between a user and a merchant, the merchant system 14 may generate a message (hereinafter a "transaction request") and communicate the transaction request to a payment gateway system 16 operated by or on behalf of a payment gateway associated with the merchant. The transaction request may include the payment device data associated with the payment device of the user associated with the debit account. The transaction request may also include the guarantor data identifying the guarantor associated with a credit account. The transaction request may include other data for processing the payment transaction according to the proxy transaction protocol. The transaction request may include data indicating that the payment transaction is a proxy transaction which causes the transaction to be processed according to the proxy transaction protocol.

In response to receiving the transaction request, the payment gateway system 16 may generate a message (hereinafter a "guarantor request") and communicate the guarantor request to a guarantor device 18 associated with the guarantor. The guarantor may be the individual or entity specified by the user, and the guarantor request may be communicated to the guarantor device 18 using the contact data provided by the user.

The guarantor device 18 may be a computing device. The guarantor request may be based on the guarantor data in the transaction request. The non-limiting example of FIG. 1 shows the payment gateway system 16 generating and communicating the guarantor request and later receiving the guarantor response from the guarantor device 18; however, the guarantor request may be generated and communicated and the guarantor response received by one or more other components of the system 10, such as the merchant system 14, the acquirer system 20, the transaction processing system 22, the issuer system 24 of the user's payment device, the issuer system 26 of the guarantor's payment device, or some combination of these system components.

Figure 4:
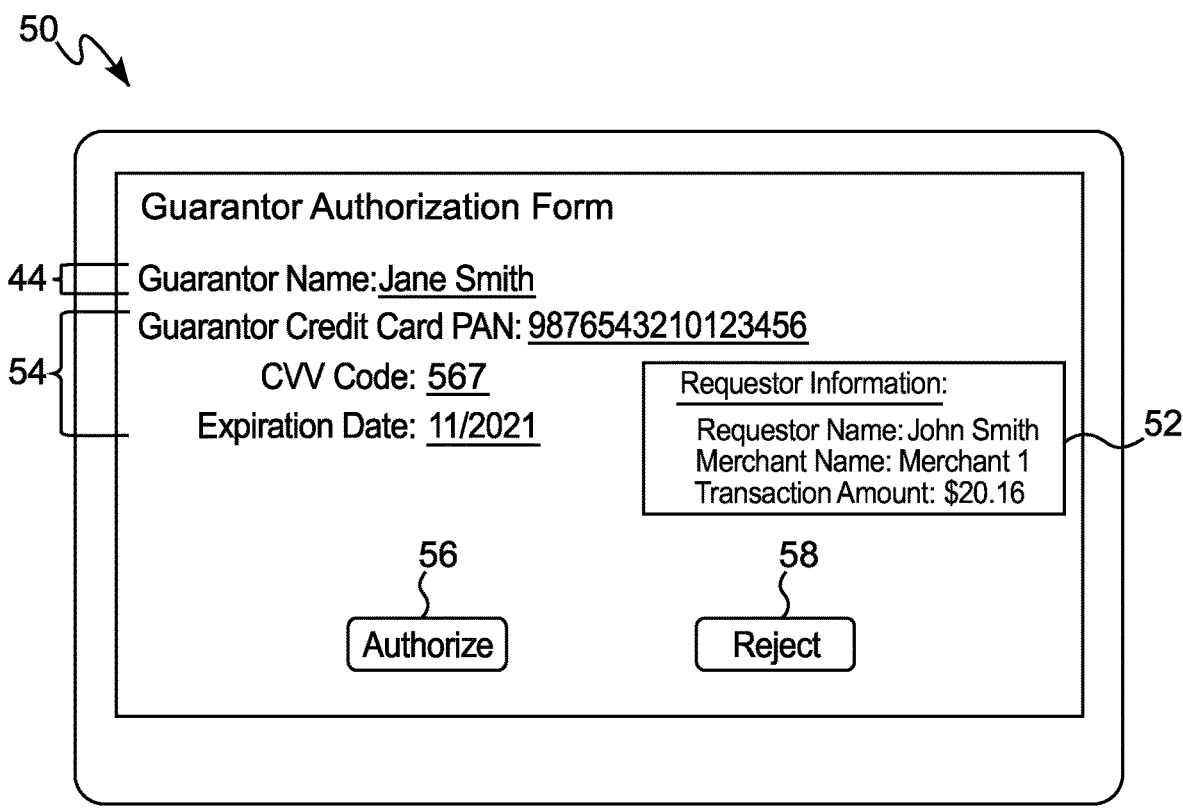
FIG. 4 shows a graphical user interface of a guarantor authorization interface according to some non-limiting embodiments or aspects.

Referring to FIG. 4, the guarantor device 18 may display a guarantor authorization interface 50 in response to receiving the guarantor request. The guarantor authorization interface 50 may display at least a portion of the guarantor data 44 and/or enable the guarantor to provide the guarantor data 44. The guarantor authorization interface may display requestor data 52 associated with the payment transaction. The requestor data may include at least a portion of the user data 32 such that the guarantor is informed as to who is requesting the guarantor for the payment transaction. The requestor data 52 may further include details associated with the payment transaction, such as at least a portion of the order data 34 such that the guarantor is informed about relevant details associated with the payment transaction.

The guarantor authorization interface 50 may enable the guarantor to provide payment device data 54 associated with the payment device (e.g., credit card) of the guarantor associated with the credit account of the guarantor. The payment device data 54 may include an account identifier (e.g., PAN) associated with the payment device, a CVV code, an expiration date, and/or the like. The payment device data 54 may include data to be used to process a payment transaction as a credit transaction using the guarantor's payment device.

The guarantor authorization interface 50 may include an authorization option 56 to authorize use of the guarantor's payment device to conduct the payment transaction as a proxy transaction and initiate further processing according to the proxy transaction protocol. The guarantor authorization interface 50 may include a reject option 58 to reject use of the guarantor's payment device to conduct the payment transaction as a proxy transaction and terminate further processing according to the proxy transaction protocol.

Referring FIGS. 1 and 4, in some non-limiting embodiments or aspects, the guarantor selecting the reject option 58 may cause the guarantor device 18 to generate and communicate a message (hereinafter a "guarantor response") to the payment gateway system 16. The guarantor response may include an indicator that the guarantor rejected processing of the payment transaction according to the proxy transaction protocol and may cause the payment transaction to be terminated. The payment gateway system 16 may communicate a notification message to the merchant system 14 and/or the user device 12 that the guarantor rejected the payment transaction such that the payment transaction has been terminated.

Referring FIGS. 1 and 4, in some non-limiting embodiments or aspects, the guarantor providing the payment device data 54 and selecting the authorization option 56 may cause the guarantor device 18 to generate and communicate a message (hereinafter a "guarantor response") to the payment gateway system 16. The guarantor response may include the payment device data 54 associated with the payment device of the guarantor associated with the credit account. The guarantor response may include an indicator that the guarantor authorized processing of the payment transaction according to the proxy transaction protocol.

In some non-limiting embodiments or aspects, in order to process the payment transaction as a proxy transaction, the guarantor may be prompted to authenticate his/her identity using an authentication method. The authentication method may include a two-factor authentication method, such as a one-time password (OTP) two-factor authentication process. The authentication of the guarantor may ensure that the proxy transaction is not being fraudulently initiated.

With continued reference to FIG. 1, in response to the guarantor response including an authorization to continue processing the proxy transaction, the payment gateway system 16 may generate and communicate a message (hereinafter "processing message") to cause an acquirer system 20 operated by or on behalf of an acquirer associated with the merchant, a transaction processing system 22 operated by or on behalf of a transaction service provider associated with the user and/or the guarantor's payment device, an issuer system 24 operated by or on behalf of an issuer of the user's payment device, and/or an issuer system 26 operated by or on behalf of an issuer of the guarantor's payment device to process the proxy transaction according to the proxy transaction protocol.

The processing message may comprise a hold request to be communicated to the issuer system 26 associated with the guarantor's payment device to cause the issuer system 26 to place a hold on the credit account of the guarantor for a transaction amount associated with the payment transaction, as hereinafter described. The hold request may comprise a requested duration of the hold on the guarantor's credit account. In some non-limiting embodiments or aspects, upon expiration of the duration of the hold, the hold may be automatically removed. In some non-limiting embodiments or aspects, upon expiration of the duration of the hold, the system 10 may process the proxy payment transaction using the credit account of the guarantor. The processing message may comprise an authorization request to cause the issuer system 24 of the user's payment device and/or the issuer system 26 of the guarantor's payment device to determine an authorization decision associated with the payment transaction, as hereinafter described. The processing message may comprise an indicator that the payment transaction is a proxy transaction to be processed according to the proxy transaction protocol.

With continued reference to FIG. 1, the payment gateway system 16 may communicate the processing message to the relevant acquirer system 20 associated with the merchant. The acquirer system 20 may generate and communicate a message (hereinafter "second processing message") to the relevant transaction processing system 22. The transaction processing system 22 may be the transaction processing system associated with the user's payment device and/or the transaction processing system associated with the guarantor's payment device. In some non-limiting embodiments, the user's payment device and the guarantor's payment device may be associated with the same transaction processing system or separate transaction processing systems. The second processing message may include at least a portion of the processing message. The second processing message may comprise an indicator that the payment transaction is a proxy transaction to be processed according to the proxy transaction protocol.

With continued reference to FIG. 1, the transaction processing system 22 may communicate a message (hereinafter "hold request") to the issuer system 26 of the guarantor's payment device. The hold request may cause the issuer system 26 of the guarantor's payment device to place a hold on the guarantor's credit account for at least a portion of the transaction amount. The hold request may comprise an indicator that the payment transaction is a proxy transaction to be processed according to the proxy transaction protocol. In some non-limiting embodiments or aspects, the hold request may cause the issuer system 26 of the guarantor's payment device (e.g., associated with a credit account) to determine an initial authorization decision (also an example of an alternate authorization decision, as described below) associated with the payment transaction for the transaction amount. The initial authorization decision may be to approve the transaction, to decline the transaction, and/or to approve the transaction at least in part. In some non-limiting embodiments, a decline authorization decision or at least a partial decline may result in termination of the processing of the payment transaction. In some non-limiting embodiments, an approve authorization decision may result in the proxy payment transaction being permitted to process to completion (e.g., authorization, clearing, and settlement). In some non-limiting embodiments, an initial authorization decision is not determined by the issuer system 26 of the guarantor's payment device in response to the hold request.

The issuer system 26 of the guarantor's payment device may communicate a message (hereinafter "hold response") to the transaction processing system 22, generated in response to the hold being placed on the credit account of the guarantor. The hold response may include an indication that the hold has been placed on the guarantor's credit account for at least a portion of the transaction amount. The hold response may include the initial authorization decision.

With continued reference to FIG. 1, in response to receiving the hold response and/or in parallel with the communication of the hold request, the transaction processing system 22 may communicate a message (hereinafter "authorization request") to the issuer system 24 of the user's payment device. The authorization request may comprise an indicator that the payment transaction is a proxy transaction to be processed according to the proxy transaction protocol. The authorization request may cause the issuer system 24 of the user's payment device (e.g., associated with a debit account) to determine an authorization decision associated with the payment transaction for the transaction amount. The authorization decision may be to approve the transaction, to decline the transaction, and/or to approve the transaction at least in part. The authorization decision may be determined based on the transaction amount and funds available in the user's debit account (e.g., the funds in the user's account being sufficient to cover the transaction amount). The issuer system 24 of the user's payment device may communicate a message (hereinafter "authorization response") to the transaction processing system 22. The authorization response may include the authorization decision. The transaction processing system 22 may continue processing the proxy transaction according to the proxy transaction protocol based on the authorization response.

In response to the issuer system 24 of the user's payment device approving the payment transaction for the transaction amount, the transaction processing system 22 may continue processing the payment transaction using the user's payment device. The transaction processing system 22 may generate and communicate a message (hereinafter "hold removal message") to the issuer system 26 of the guarantor's payment device to cause the issuer system 26 of the guarantor's payment device to remove the hold on the guarantor's credit account for the portion of the transaction amount. The transaction processing system 22 may cause the funds for the transaction amount to be transferred from the user's debit account and transferred to an account of the merchant to settle the payment transaction.

In response to the issuer system 24 of the user's payment device declining the payment transaction for the transaction amount, the transaction processing system 22 may continue processing the payment transaction using the guarantor's payment device. The transaction processing system 22 may communicate a message (hereinafter "alternate authorization message") to the issuer system 26 of the guarantor's payment device to cause the issuer system 26 of the guarantor's payment device to determine an alternate authorization decision for the transaction amount of the payment transaction. The alternate authorization decision may be to approve the transaction, to decline the transaction, and/or to approve the transaction at least in part. The issuer system 26 of the guarantor's payment device may communicate a message (hereinafter "alternate authorization response") to the transaction processing system 22. The alternate authorization response may include the alternate authorization decision. In response to the alternate authorization decision to approve the payment transaction, the transaction processing system 22 may cause the funds for the transaction amount to be transferred from a credit account associated with the guarantor (e.g., an account of the guarantor's creditor) to an account of the merchant to settle the payment transaction.

In some non-limiting embodiments or aspects, the transaction processing system 22 may cause the funds for the transaction amount to be transferred from a credit account associated with the guarantor (e.g., an account of the guarantor's creditor) to an account of the merchant to settle the payment transaction without the alternate authorization message and alternate authorization response being communicated between the transaction processing system 22 and the issuer system 26 of the guarantor's payment device. This may occur in response to the initial authorization decision approving the transaction constituting the alternate authorization decision of the issuer system 26 of the guarantor's payment device. In this way, the issuer system 26 of the guarantor's payment device may pre-authorize the payment transaction for the transaction amount before the authorization request is sent to the issuer system 24 of the user's payment device in response to the issuer system 24 of the user's payment device declining the payment transaction.

In response to the issuer system 24 of the user's payment device approving the payment transaction for only a portion of the transaction amount, the transaction processing system 22 may continue processing the payment transaction using the user's payment device for a portion of the transaction amount and using the guarantor's payment device for a remainder of the transaction amount. The transaction processing system 22 may generate and communicate the hold removal message to the issuer system 26 of the guarantor's payment device to cause the issuer system 26 of the guarantor's payment device to remove the hold on the guarantor's credit account for the portion of the transaction amount to be covered by the user's payment device. The transaction processing system 22 may cause the funds for the transaction amount to be covered by the user's payment device to be transferred from the user's debit account and transferred to an account of the merchant to settle the payment transaction. The remainder of the transaction amount may be covered by the guarantor's credit account as previously described, such that the transaction processing system 22 may cause the funds for the remainder of the transaction amount to be covered by the guarantor's payment device to be transferred from the credit account associated with the guarantor (e.g., an account of the guarantor's creditor) to an account of the merchant to settle the payment transaction.

With continued reference to FIG. 1, the transaction processing system 22 may communicate a message (hereinafter "processing response") to the acquirer system 20. The processing response may contain data associated with the processing of the payment transaction. The processing response may contain the authorization decision of the issuer system 24 of the user's payment device and/or the authorization decision of the issuer system 26 of the guarantor's payment device. The processing response may contain data identifying or that can be used to determine whether the payment transaction was completed using the user's payment device, the guarantor's payment device, or some combination of the user's and guarantor's payment devices.

With continued reference to FIG. 1, the acquirer system 20 may communicate a message (hereinafter "second processing response") to the payment gateway system 16. The second processing response may include at least a portion of the processing response. The payment gateway system 16 may communicate a notification message to the merchant system 14, the user device 12, and/or the guarantor device 18 that may include at least a portion of the processing response to notify the merchant, the guarantor, and/or the user as to how the proxy transaction is being processed to completion, including settlement.

With continued reference to FIG. 1, in the non-limiting example of the system 10 for processing payment transactions via a proxy guarantor, the payment gateway system 16, the acquirer system 20, and the transaction processing system 22 are shown. In some non-limiting embodiments or aspects, any function described as being performed by one of the payment gateway system 16, the acquirer system 20, and/or the transaction processing system 22 may alternatively be performed by another of these components. Moreover, in some non-limiting embodiments or aspects, one of the payment gateway system 16, the acquirer system 20, and the transaction processing system 22 may be omitted from the system and the functionality associated with such omitted components may be performed by the other of the components not omitted. In some non-limiting embodiments or aspects, the acquirer system 20 and the payment gateway system 16 may be omitted, such that the transaction processing system 22 performs the functions described as being associated with the acquirer system 20 and the payment gateway system 16.

Figure 5:
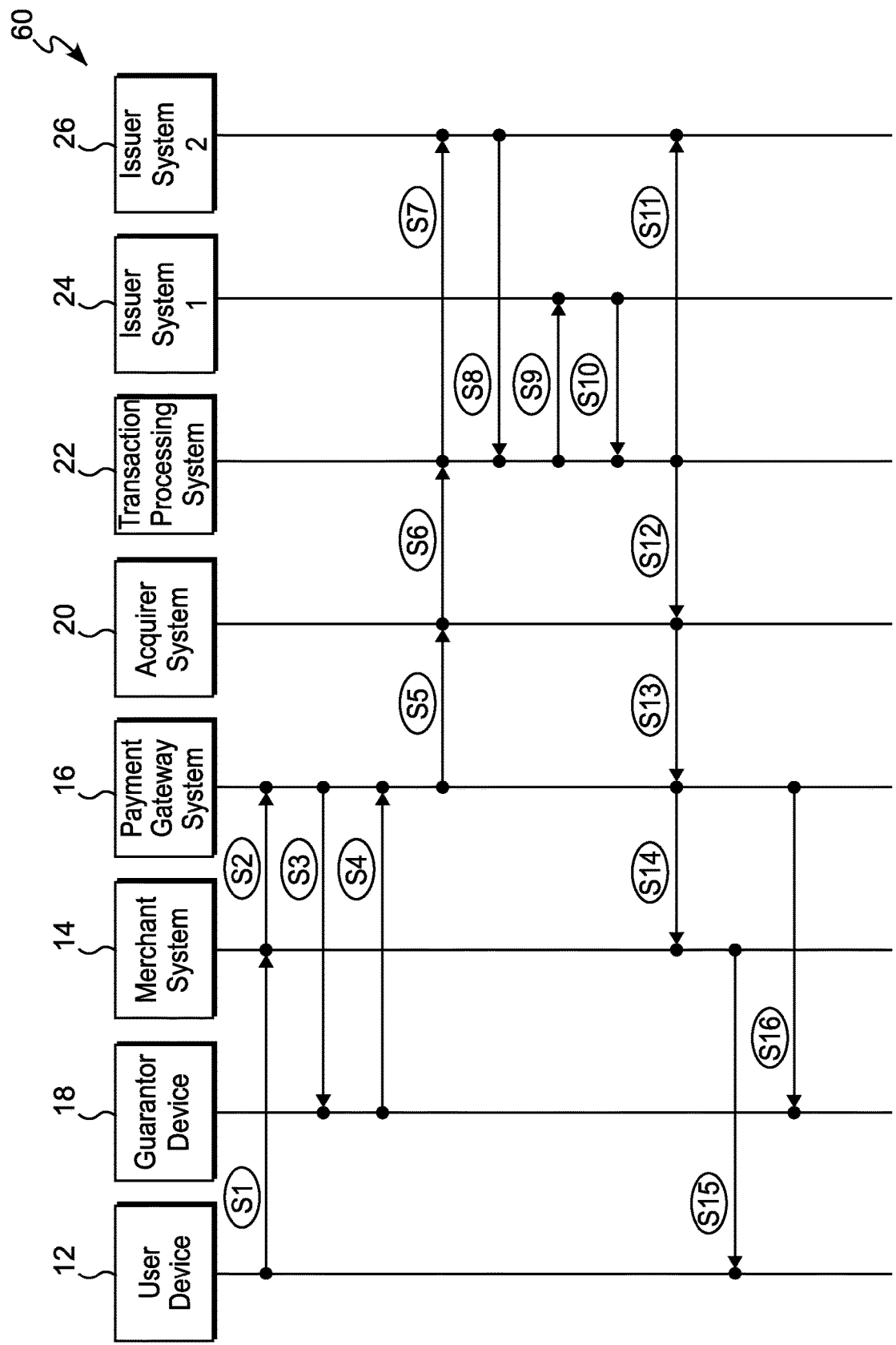
FIG. 5 shows a process flow diagram of a method for processing a payment transaction via a proxy guarantor according to some non-limiting embodiments or aspects.

Referring to FIG. 5, a method 60 for processing a payment transaction via a proxy guarantor using the user's payment device according to some non-limiting embodiments or aspects is shown. At a step S1, the user device 12 may initiate a proxy guarantor payment transaction with the merchant system 14 by providing a payment device of the user having stored thereon payment device data associated with a debit account. The user may specify guarantor data identifying a guarantor having a credit account for processing the proxy payment transaction to initiate the proxy payment transaction with the merchant system 14. At a step S2, the merchant system 14 may generate and communicate the transaction request to the payment gateway system 16.

At a step S3, the payment gateway system 16 may generate and communicate the guarantor request to the guarantor device 18. At a step S4, the guarantor device 18 may generate and communicate the guarantor response to the payment gateway system 16, and the guarantor response may include payment device data associated with the credit account of the guarantor.

At a step S5, the payment gateway system 16 may communicate the processing message to the acquirer system 20. At a step S6, the acquirer system 20 may communicate the second processing message to the transaction processing system 22.

At a step S7, the transaction processing system may communicate the hold request to the issuer system 26 of the guarantor payment device to cause the issuer system 26 of the guarantor payment device to place a hold on the guarantor's credit account for at least a portion of the transaction amount. At a step S8, the issuer system 26 of the guarantor payment device may place the hold on the guarantor's credit account for the portion of the transaction amount and may generate and communicate the hold response to the transaction processing system 22.

At a step S9, the transaction processing system 22 may communicate the authorization request to the issuer system 24 of the user's payment device to cause the issuer system 24 of the user's payment device to determine an authorization decision associated with the proxy payment transaction. At a step S10, the issuer system 24 of the user's payment device may determine that the authorization decision is to approve the proxy payment transaction for the transaction amount and generate and communicate the authorization response to the transaction processing system 22 including the approval authorization decision.

At a step S11, the transaction processing system 22 may communicate the hold removal message to the issuer system 26 of the guarantor payment device to cause the issuer system 26 of the guarantor payment device to remove the hold from the guarantor's credit account for the portion of the transaction amount.

At a step S12, the transaction processing system 22 may communicate the processing response to the acquirer system 20. At a step S13, the acquirer system 20 may communicate the second processing response to the payment gateway system 16.

At a step S14, the payment gateway system 16 may communicate a message to the merchant system 14 to notify the merchant system 14 that the proxy payment transaction has been approved. The message may notify the merchant system 14 that the proxy payment transaction is being processed using the user's debit account.

At a step S15, the merchant system 14 may communicate a message to the user device 12 to notify the user device 12 that the proxy payment transaction has been approved. The message may notify the user device 12 that the proxy payment transaction is being processed using the user's debit account. The payment gateway system 16 may notify the user device 12 via the merchant system 14 in some non-limiting embodiments or aspects.

At a step S16, the payment gateway system 16 may communicate a message to the guarantor device 18 to notify the guarantor device 18 that the proxy payment transaction has been approved. The message may notify the guarantor device 18 that the proxy payment transaction is being processed using the user's debit account.

Figure 6:
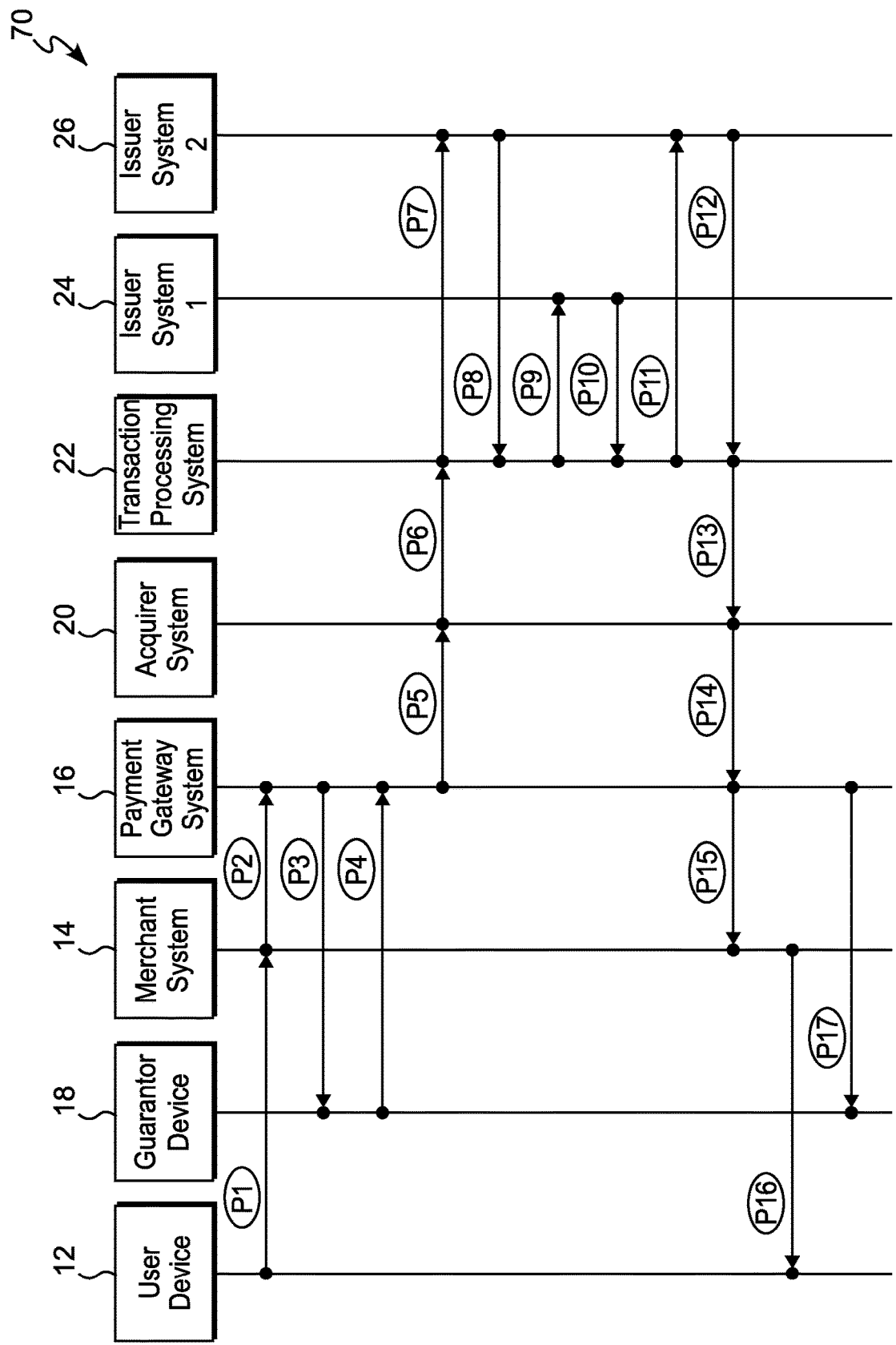
FIG. 6 shows a process flow diagram of a method for processing a payment transaction via a proxy guarantor according to some non-limiting embodiments or aspects.

Referring to FIG. 6, a method 70 for processing a payment transaction via a proxy guarantor using the guarantor's payment device according to some non-limiting embodiments or aspects is shown. With respect to steps P1-P9, each steps is identical to each of steps S1-S9, respectively, described in connection with FIG. 5.

At a step P10, the issuer system 24 of the user's payment device may determine the authorization decision is to decline the proxy payment transaction for the transaction amount and generate and communicate the authorization response to the transaction processing system 22 including the decline authorization decision. The decline authorization decision may be based on the user's debit account not having sufficient funds to cover the transaction amount.

At a step P11, the transaction processing system 22 may communicate the alternate authorization message to the issuer system 26 of the guarantor payment device to cause the issuer system 26 of the guarantor payment device to determine an authorization decision associated with the proxy payment transaction. At a step P12, the issuer system 26 of the guarantor's payment device may determine the authorization decision is to approve the proxy payment transaction for the transaction amount and generate and communicate the alternate authorization response to the transaction processing system 22 including the approval authorization decision. In some non-limiting embodiments or aspects, steps P11 and P12 may be performed before and/or after the issuer system 24 of the user's payment device determines its authorization decision is to decline the proxy payment transaction (in steps P9-P10). In some non-limiting embodiments or aspects, steps P11 and P12 may be performed simultaneously with steps P7 and P8.

At a step P13, the transaction processing system 22 may communicate the processing response to the acquirer system 20. At a step P14, the acquirer system 20 may communicate the second processing response to the payment gateway system 16.

At a step P15, the payment gateway system 16 may communicate a message to the merchant system 14 to notify the merchant system 14 that the proxy payment transaction has been approved. The message may notify the merchant system 14 that the proxy payment transaction is being processed using the guarantor's credit account.

At a step P16, the merchant system 14 may communicate a message to the user device 12 to notify the user device 12 that the proxy payment transaction has been approved. The message may notify the user device 12 that the proxy payment transaction is being processed using the guarantor's credit account. The payment gateway system 16 may notify the user device 12 via the merchant system 14 in some non-limiting embodiments or aspects.

At a step P17, the payment gateway system 16 may communicate a message to the guarantor device 18 to notify the guarantor device 18 that the proxy payment transaction has been approved. The message may notify the guarantor device 18 that the proxy payment transaction is being processed using the guarantor's credit account.

Figure 7:
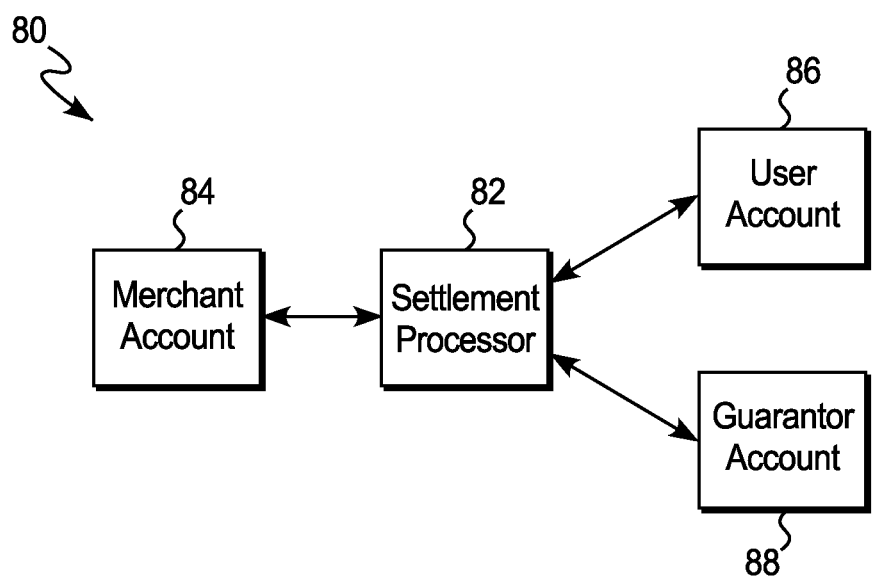
FIG. 7 shows a schematic view of a system for settling a payment transaction initiated using a proxy guarantor according to some non-limiting embodiments or aspects.

Referring to FIG. 7, a system 80 for settling a payment transaction initiated using a proxy guarantor according to some non-limiting embodiments or aspects is shown. The system 80 may include a settlement processor 82 operated by or on behalf of at least one of the payment gateway, the acquirer, the transaction service provider, and the issuer of the payment device of the user and/or the guarantor. In some non-limiting embodiments or aspects, the settlement processor 82 may be in communication with at least one of the payment gateway system 16, acquirer system 20, the transaction processing system 22, the issuer system 24 of the user's payment device, and the issuer system 26 of the guarantor's payment device and receive a message from at least one of the systems to cause the settlement processor 82 to settle the proxy payment transaction. In some non-limiting embodiments or aspects, at least one of the merchant system 14, the payment gateway system 16, and the acquirer system 20 may communicate a settlement file to the settlement processor 82 (directly or indirectly) to cause the proxy payment transaction to be settled according to the proxy transaction protocol.

The settlement processor 82 may be in communication with a merchant account 84 associated with the merchant in the proxy payment transaction, a user account 86 associated with the user (e.g., debit account of the user) in the proxy payment transaction, and/or a guarantor account 88 associated with the guarantor (e.g., an account of the guarantor's creditor) in the proxy payment transaction so as to be enabled to transfer funds to and and/or from the merchant account 84, the user account 86, and/or the guarantor account 88 to effect a fund transfer (e.g., to settle the proxy payment transaction).

With continued reference to FIG. 7, in some non-limiting embodiments or aspects in which the proxy payment transaction is to be processed using the user's payment device, the settlement processor 82 may communicate with the user account 86 and the merchant account 84 to transfer funds for the transaction amount from the user account 86 to the merchant account 84 to settle the payment transaction. In some non-limiting embodiments or aspects in which the proxy payment transaction is to be processed using the guarantor's payment device, the settlement processor 82 may communicate with the guarantor account 88 and the merchant account 84 to transfer funds for the transaction amount from the guarantor account 88 to the merchant account 84 to settle the payment transaction. In some non-limiting embodiments or aspects in which the proxy payment transaction is to be processed using the user's payment device for a portion of the transaction amount and the guarantor's payment device for the remainder of the transaction amount, the settlement processor 82 may communicate with the user account 86, the guarantor account 88, and the merchant account 84 to transfer funds for the portion of the transaction amount from the user account 86 to the merchant account 84 and for the remainder of the transaction amount from the guarantor account 88 to the merchant account 84 to settle the payment transaction.

With continued reference to FIG. 7, in some non-limiting embodiments or aspects, the settlement processor 82 may transfer an additional proxy transaction processing fee (beyond the transaction amount) from the user account 86 to at least one of the guarantor account 88 and the merchant account 84 in response to the user requesting the payment transaction be processed according to the proxy transaction protocol and/or in response to the payment transaction successfully being processed according to the proxy transaction protocol.

Figure 8:
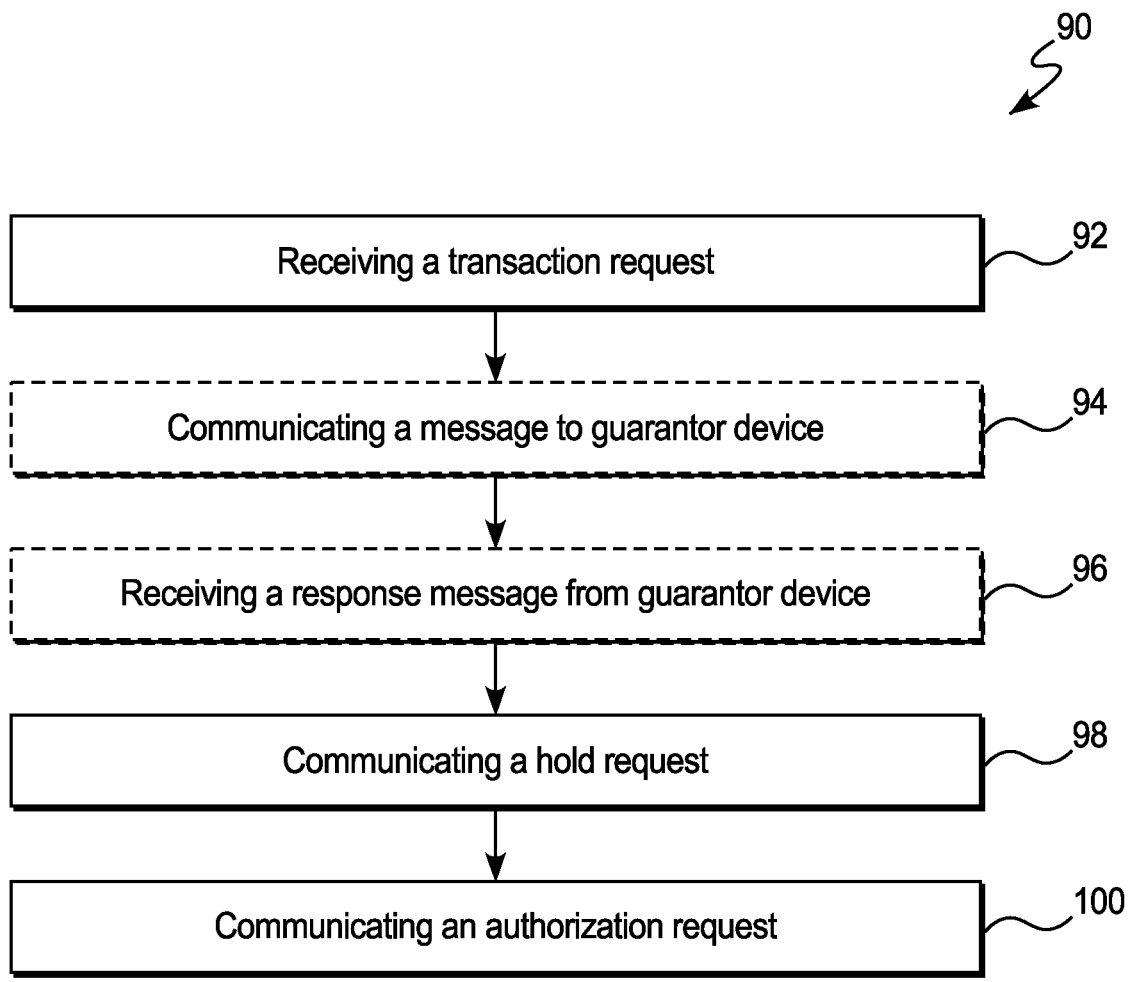
FIG. 8 shows a step diagram of a method for processing a payment transaction via a proxy guarantor according to some non-limiting embodiments or aspects.

Referring to FIG. 8, a method 90 for processing a payment transaction via a proxy guarantor according to some non-limiting embodiments or aspects is shown. At a step 92, the payment gateway system 16, the acquirer system 20, and/or the transaction processing system 22 may receive a transaction request associated with a payment transaction for a transaction amount. The payment transaction may be associated with a user. The transaction request may include payment device data associated with a payment device and debit account of the user and guarantor data identifying a guarantor associated with a credit account.

At a step 94, the payment gateway system 16, the acquirer system 20, and/or the transaction processing system 22 may communicate a message (the guarantor request) to the guarantor device 18 based on the guarantor data.

At a step 96, the payment gateway system 16, the acquirer system 20, and/or the transaction processing system 22 may receive a response message (the guarantor response) from the guarantor device 18. The guarantor response may include payment device data associated with a payment device associated with the credit account of the guarantor.

At a step 98, the payment gateway system 16, the acquirer system 20, and/or the transaction processing system 22 may communicate the hold request to the issuer system 26 of the guarantor's payment device to cause the issuer system 26 of the guarantor's payment device to place a hold on the credit account of the guarantor for at least a portion of the transaction amount.

At a step 100, the payment gateway system 16, the acquirer system 20, and/or the transaction processing system 22 may communicate the authorization request to the issuer system 24 of the user's payment device.

In a further, non-limiting embodiment or aspect, a computer program product for processing a payment transaction via a proxy guarantor includes at least one non-transitory computer readable medium including program instructions that, when executed by at least one processor, cause the at least one processor to execute one of the previously-described methods. The at least one processor may include at least one of the following: the merchant system 14, the payment gateway system 16, the acquirer system 20, the transaction processing system 22, the issuer system 24 of the user's payment device, and the issuer system 26 of the guarantor's payment device.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A method for processing a payment transaction via a proxy guarantor, comprising:
   receiving a transaction request from a merchant website of a merchant system that only accepts electronic payments involving credit accounts, wherein the transaction request is generated by the user by engaging with a graphical user interface of a computing device of the user, wherein the transaction request comprises a transaction amount and an indicator from the merchant website,
   wherein the transaction request is a modified transaction request, modified from a transaction request generated for a transaction that does not trigger the proxy transaction protocol,
   wherein the modified transaction request comprises an indicator of the user selection of a selectable option of the proxy transaction protocol,
   wherein the selectable option is displayed by the merchant website on the graphical user interface of the computing device of the user, and
   wherein the modified transaction request triggers processing of the payment transaction, using the proxy transaction protocol and using the payment device of the user issued for the debit account, and without using a payment device of the user issued for a credit account;
   in response to receiving the transaction request, initiating, with at least one processor, a payment transaction between a user and the merchant system, wherein a payment device of the user is used during processing of the payment transaction, and wherein the payment device of the user was issued for a debit account and not issued for a credit account;
   triggering, with the at least one processor, a proxy transaction protocol in response to receiving the transaction request;
   in response to the triggering of the proxy transaction protocol, generating a proxy selection message, and communicating, with the at least one processor, the proxy selection message to the computing device of the user that, when received by the computing device of the user, displays a proxy selection interface on the graphical user interface of the computing device of the user;
   receiving, with the at least one processor, from the computing device of the user, a proxy selection response based on user input to the graphical user interface of the computing device of the user, the proxy selection response comprising:
      payment device data of the payment device of the user, wherein the payment device was issued for the debit account; and
      guarantor data identifying a guarantor different from the user and having a credit account different from the debit account;
   during processing of the payment transaction, and prior to communicating an authorization request to an issuer system:
      generating, with the at least one processor, a message comprising user identifying data of the user,
      communicating the message comprising user identifying data to a computing device of the guarantor based on the guarantor data that, when received by the computing device of the guarantor, displays the user identifying data of the user and a selectable authorize option on a graphical user interface of the computing device of the guarantor, and prompts the computing device of the guarantor to generate a response message, based on input from the guarantor to the graphical user interface of the computing device of the guarantor by selecting the authorize option, and
      receiving, with the at least one processor, the response message from the computing device, of the guarantor indicating authorization by the guarantor, the response message comprising payment device data of a payment device of the guarantor issued for the credit account;
   in response to receiving the response message, and based on the payment device data of the payment device of the guarantor issued for the credit account, generating, with the at least one processor, a hold request, and communicating the hold request to an issuer system that issued the credit account, wherein the issuer system that issued the credit account corresponds to the credit account of the guarantor, and wherein the hold request causes the issuer system that issued the credit account to place a hold on the credit account for at least a portion of the transaction amount;
   in response to the hold being placed on the credit account, generating, with the at least one processor, an authorization request, and communicating the authorization request to an issuer system that issued the debit account, wherein the issuer system that issued the debit account comprises an authorization server and corresponds to the debit account of the user, and wherein the issuer system that issued the debit account is different from the issuer system that issued the credit account;

receiving, with the at least one processor, an authorization response generated by the authorization server of the issuer system that issued the debit account, the authorization response comprising an authorization approval;

communicating, with the at least one processor, a hold removal message to the issuer system that issued the credit account that, when received by the issuer system that issued the credit account, causes the issuer system that issued the credit account to remove the hold on the credit account; and during settlement of the payment transaction, transferring the transaction amount from the debit account to an account of the merchant system.

2. The method of claim 1, wherein the guarantor data comprises contact data of the guarantor.

3. A system for processing a payment transaction via a proxy guarantor, comprising at least one processor programmed or configured to:

receive a transaction request from a merchant website of a merchant system that only accepts electronic payments involving credit accounts, wherein the transaction request is generated by the user by engaging with a graphical user interface of a computing device of the user, wherein the transaction request comprises a transaction amount and an indicator from the merchant website;

in response to receiving the transaction request, initiate, with at least one processor, a payment transaction between a user and the merchant system, wherein a payment device of the user is used during processing of the payment transaction, and wherein the payment device of the user was issued for a debit account and not issued for a credit account;

trigger, with the at least one processor, a proxy transaction protocol in response to receiving the transaction request;

wherein the transaction request is a modified transaction request, modified from a transaction request generated for a transaction that does not trigger the proxy transaction protocol, wherein the modified transaction request comprises an indicator of the user selection of a selectable option of the proxy transaction protocol, wherein the selectable option is displayed by the merchant website on the graphical user interface of the computing device of the user, and wherein the modified transaction request triggers processing of the payment transaction, using the proxy transaction protocol and using the payment device of the user issued for the debit account, and without using a payment device of the user issued for a credit account;

in response to the triggering of the proxy transaction protocol, generate a proxy selection message, and communicate the proxy selection message to the computing device of the user that, when received by the computing device of the user, displays a proxy selection interface on the graphical user interface of the computing device of the user;

receive, from the computing device of the user, a proxy selection response based on user input to the graphical user interface of the computing device of the user, the proxy selection response comprising:

payment device data of the payment device of the user, wherein the payment device was-issued for the debit account; and guarantor data identifying a guarantor different from the user and having a credit account different from the debit account;

during processing of the payment transaction, and prior to communicating an authorization request to an issuer system:

generate a message comprising user identifying data of the user, communicate the message comprising user identifying data to a computing device of the guarantor based on the guarantor data that when received by the computing device of the guarantor, displays the user identifying data of the user and a selectable authorize option on a graphical user interface of the computing device of the guarantor, and prompts the computing device of the guarantor to generate a response message, based on input from the guarantor to the graphical user interface of the computing device of the guarantor by selecting the authorize option, and receive the response message from the computing device, of the guarantor indicating authorization by the guarantor, the response message comprising payment device data of a payment device of the guarantor issued for the credit account;

in response to receiving the response message, and based on the payment device data of the payment device of the guarantor issued for the credit account, generate a hold request, and communicate the hold request to an issuer system that issued the credit account, wherein the issuer system that issued the credit account corresponds to the credit account of the guarantor, and wherein the hold request causes the issuer system that issued the credit account to place a hold on the credit account for at least a portion of the transaction amount;

in response to the hold being placed on the credit account, generate an authorization request, and communicate the authorization request to an issuer system that issued the debit account, wherein the issuer system that issued the debit account comprises an authorization server and corresponds to the debit account of the user, and wherein the issuer system that issued the debit account is different from the issuer system that issued the credit account;

receive an authorization response generated by the authorization server of the issuer system that issued the debit account, the authorization response comprising an authorization approval;

communicate a hold removal message to the issuer system that issued the credit account that when received by the issuer system that issued the credit account, causes the issuer system that issued the credit account to remove the hold on the credit account; and during settlement of the payment transaction, transfer the transaction amount from the debit account to an account of the merchant system.

4. The system of claim 3, wherein the guarantor data comprises contact data of the guarantor.

5. The system of claim 3, wherein the at least one processor is further programmed or configured to:

receive an authorization response from the issuer system that issued the debit account, wherein the authorization response comprises an authorization decline; and communicate a second authorization request to the issuer system that issued the credit account.

6. The system of claim 5, the at least one processor further programmed or configured to settle the payment transaction, wherein during settlement of the payment transaction, the transaction amount is transferred from the credit account to the account of the merchant system.

7. A computer program product for processing a payment transaction via a proxy guarantor, the computer program product comprising at least one non-transitory computer-readable medium including one or more instructions that, when executed by at least one processor, cause the at least one processor to:
- receive a transaction request from a merchant website of a merchant system that only accepts electronic payments involving credit accounts, wherein the transaction request is generated by the user by engaging with a graphical user interface of a computing device of the user, wherein the transaction request comprises a transaction amount and an indicator from the merchant website;
- wherein the transaction request is a modified transaction request, modified from a transaction request generated for a transaction that does not trigger the proxy transaction protocol, wherein the modified transaction request comprises an indicator of the user selection of a selectable option of the proxy transaction protocol, wherein the selectable option is displayed by the merchant website on the graphical user interface of the computing device of the user, and wherein the modified transaction request triggers processing of the payment transaction, using the proxy transaction protocol and using the payment device of the user issued for the debit account, and without using a payment device of the user issued for a credit account;
- in response to receiving the transaction request, initiate, with at least one processor, a payment transaction between a user and the merchant system, wherein a payment device of the user is used during processing of the payment transaction, and wherein the payment device of the user was issued for a debit account and not issued for a credit account;
- trigger, with the at least one processor, a proxy transaction protocol in response to receiving the transaction request;
- in response to the triggering of the proxy transaction protocol, generate a proxy selection message, and communicate the proxy selection message to the computing device of the user that, when received by the computing device of the user, displays a proxy selection interface on the graphical user interface of the computing device of the user;
- receive, from the computing device of the user, a proxy selection response based on user input to the graphical user interface of the computing device of the user, the proxy selection response comprising:
  - payment device data of the payment device of the user, wherein the payment device was issued for the debit account; and
  - guarantor data identifying a guarantor different from the user and having a credit account different from the debit account;
- during processing of the payment transaction, and prior to communicating an authorization request to an issuer system:
  - generate a message comprising user identifying data of the user,
  - communicate the message comprising user identifying data to a computing device of the guarantor based on the guarantor data that, when received by the computing device of the guarantor, displays the user identifying data of the user and a selectable authorize option on a graphical user interface of the computing device of the guarantor, and prompts the computing device of the guarantor to generate a response message, based on input from the guarantor to the graphical user interface of the computing device of the guarantor by selecting the authorize option, and
  - receive the response message from the computing device, of the guarantor indicating authorization by the guarantor, the response message comprising payment device data of a payment device of the guarantor issued for the credit account;
- in response to receiving the response message, and based on the payment device data of the payment device of the guarantor issued for the credit account, generate a hold request, and communicate the hold request to an issuer system that issued the credit account, wherein the issuer system that issued the credit account corresponds to the credit account of the guarantor, and wherein the hold request causes the issuer system that issued the credit account to place a hold on the credit account for at least a portion of the transaction amount;
- in response to the hold being placed on the credit account, generate an authorization request, and communicate the authorization request to an issuer system that issued the debit account, wherein the issuer system that issued the debit account comprises an authorization server and corresponds to the debit account of the user, and wherein the issuer system that issued the debit account is different from the issuer system that issued the credit account;
- receive an authorization response generated by the authorization server of the issuer system that issued the debit account, the authorization response comprising an authorization approval;
- communicate a hold removal message to the issuer system that issued the credit account that, when received by the issuer system that issued the credit account, causes the issuer system that issued the credit account to remove the hold on the credit account; and
- during settlement of the payment transaction, transfer the transaction amount from the debit account to an account of the merchant system.

8. The computer program product of claim 7, wherein the guarantor data comprises contact data of the guarantor.

* * * * *